(12) United States Patent
Yang (10) Patent No.: US 12,010,570 B2
(45) Date of Patent: Jun. 11, 2024

(54) METHOD AND DEVICE FOR ESTABLISHING AGGREGATED CONNECTION

(71) Applicant: XIAOMI COMMUNICATIONS CO., LTD., Beijing (CN)

(72) Inventor: Xing Yang, Beijing (CN)

(73) Assignee: XIAOMI COMMUNICATIONS CO., LTD., Beijing (CN)

( * ) Notice: Subject to any disclaimer, the term of this patent is extended or adjusted under 35 U.S.C. 154(b) by 420 days.

(21) Appl. No.: 17/617,915

(22) PCT Filed: Jun. 14, 2019

(86) PCT No.: PCT/CN2019/091314
§ 371 (c)(1),
(2) Date: Dec. 9, 2021

(87) PCT Pub. No.: WO2020/248237
PCT Pub. Date: Dec. 17, 2020

(65) Prior Publication Data
US 2022/0312281 A1 Sep. 29, 2022

(51) Int. Cl.
*H04W 36/36* (2009.01)
*H04W 36/00* (2009.01)
*H04W 36/08* (2009.01)

(52) U.S. Cl.
CPC . *H04W 36/00835* (2018.08); *H04W 36/0027* (2013.01); *H04W 36/0058* (2018.08);
(Continued)

(58) Field of Classification Search
None
See application file for complete search history.

(56) References Cited

U.S. PATENT DOCUMENTS

| 2012/0302245 A1 | 11/2012 | Huang |
| 2013/0022023 A1 | 1/2013 | Aydin |

(Continued)

FOREIGN PATENT DOCUMENTS

| CN | 104301948 A | 1/2015 |
| CN | 104427566 A | 3/2015 |

(Continued)

OTHER PUBLICATIONS

International Search Report of PCT/CN2019/091314 dated Mar. 12, 2020 with English translation, (4p).
(Continued)

*Primary Examiner* — Angela Nguyen
(74) *Attorney, Agent, or Firm* — Arch & Lake LLP (57) ABSTRACT

A method for establishing an aggregated connection is provided. The method is executed by a terminal. The method includes: before a terminal performs cell handover, the terminal receives a conditional handover (CHO) command sent by a source base station, where the CHO command including respective aggregation configuration information of at least one candidate cell; in response to determining that the terminal is handed over to a target cell, the terminal directly acquires target aggregation configuration from aggregation configuration information of the target cell; and the terminal establishes an aggregated connection on the basis of the target aggregation configuration.

19 Claims, 5 Drawing Sheets

---

201 — receiving a conditional handover CHO command sent by a source base station, wherein the CHO command contains respective aggregation configuration information of at least one candidate cell 202 — acquiring a target aggregation configuration from the aggregation configuration information of a target cell, when the terminal switches to the target cell among the at least one candidate cell 203 — establishing an aggregation connection corresponding to the target aggregation configuration (52) U.S. Cl.
CPC ....... *H04W 36/0069* (2018.08); *H04W 36/08* (2013.01); *H04W 36/36* (2013.01); *H04W 36/362* (2023.05)

(56) References Cited

U.S. PATENT DOCUMENTS

| | | |
|---|---|---|
| 2013/0100931 A1 | 4/2013 | Kim |
| 2014/0045504 A1 | 2/2014 | Jung et al. |
| 2017/0055187 A1 | 2/2017 | Kang et al. |
| 2018/0279193 A1 | 9/2018 | Park et al. |
| 2020/0022035 A1* | 1/2020 | Kadiri ............... H04W 36/0072 |

FOREIGN PATENT DOCUMENTS

| | | | |
|---|---|---|---|
| CN | 104581810 A | 4/2015 | |
| CN | 105517067 A | 4/2016 | |
| WO | WO2018156696 A1 | 8/2018 | |
| WO | WO2019098910 A1 | 5/2019 | |
| WO | WO-2020139015 A1 * | 7/2020 | ........ H04W 36/0044 |

OTHER PUBLICATIONS

First Office Action issued to Chinese Application No. 201980001066.3 dated Jan. 5, 2021 with English translation (23p).
Extended European Search Report issued in Application No. 19933023.4, dated May 20, 2022,(12p).
Nokia, et al. "Basic Details of Conditional Handover in E-UTRAN" 3GPP TSG RAN WG1 Meeting #105, R2-1902254, Athens, Greece, Feb. 25-Mar. 1, 2019, (4p).

* cited by examiner

FIG. 1

FIG. 2 sending a conditional handover CHO command to the terminal, wherein the CHO command contains respective aggregation configuration information of at least one candidate cell  301

FIG. 3 receiving terminal information of the terminal sent by a source base station when the terminal performs cell handover  401 returning a handover command of the candidate cell to the source base station, wherein the handover command contains aggregation configuration information of the candidate cell  402

METHOD AND DEVICE FOR ESTABLISHING AGGREGATED CONNECTION

CROSS-REFERENCE TO RELATED APPLICATION

This application is the U.S. national phase application of International Application No. PCT/CN2019/091314, filed on Jun. 14, 2019, the entire contents of which are incorporated herein by reference for all purposes.

TECHNICAL FIELD

The present disclosure relates to the field of wireless communication technology, and in particular to a method, an apparatus for establishing an aggregation connection and a storage medium.

BACKGROUND

In wireless communication, the aggregation technology is introduced to increase the data transmission rate, so that the terminal can simultaneously transmit data on a plurality of carrier frequencies.

In related technologies, each cell sets an aggregation configuration for the terminal according to its own deployment situation. When the terminal switches between cells, the aggregation configuration of the target cell after the handover and that of the source cell before the handover may be different. Therefore, the terminal needs to release the aggregation configuration of the source cell first, after successfully accessing the target cell, the target cell sends the new aggregation configuration to the terminal. However, the above manner requires the terminal to wait for the target cell to send the aggregation configuration, which results in a decrease in the data transmission rate.

SUMMARY

The present disclosure provides a method, an apparatus for establishing an aggregation connection and a storage medium. The technical solution is as follows.

According to a first aspect of the present disclosure, there is provided a method for establishing an aggregation connection, executed by a terminal and including:
receiving a conditional handover (CHO) command sent by a source base station, where the CHO command includes respective aggregation configuration information of at least one candidate cell;
acquiring a target aggregation configuration from aggregation configuration information of a target cell, in response to determining that the terminal switches to the target cell among the at least one candidate cell; and
establishing an aggregation connection corresponding to the target aggregation configuration.

According to a second aspect of the present disclosure, there is provided a method for establishing an aggregation connection, executed by a source base station when a terminal performs cell handover. The method includes: sending a CHO command to the terminal, where the CHO command includes respective aggregation configuration information of at least one candidate cell.

According to a third aspect of the present disclosure, there is provided a method for establishing an aggregation connection, executed by a base station corresponding to a candidate cell when a terminal performs cell handover. The method includes: receiving terminal information of the terminal sent by a source base station in response to determining that the terminal performs cell handover, where the terminal information includes terminal environment user equipment (UE) context of the terminal and a measurement result of the terminal; and returning a handover command of the candidate cell to the source base station, where the handover command includes aggregation configuration information of the candidate cell.

According to a fourth aspect of the present disclosure, there is provided an apparatus for establishing an aggregation connection, applied in a terminal, and including a processor, and a memory for storing executable instructions of the processor.

Further, the processor is configured to: receive a CHO command sent by a source base station, where the CHO command includes respective aggregation configuration information of at least one candidate cell; acquire a target aggregation configuration from aggregation configuration information of a target cell, in response to determining that the terminal switches to the target cell among the at least one candidate cell; and establish an aggregation connection corresponding to the target aggregation configuration.

According to a fifth aspect of the present disclosure, there is provided an apparatus for establishing an aggregation connection, applied in a source base station when a terminal performs cell handover, and the apparatus including: a processor and a memory for storing executable instructions of the processor.

Further, the processor is configured to: send a CHO command to the terminal, where the CHO command includes respective aggregation configuration information of at least one candidate cell.

According to a sixth aspect of the present disclosure, there is provided an apparatus for establishing an aggregation connection, applied in a base station corresponding to a candidate cell when a terminal performs cell handover, and the apparatus including: a processor and a memory for storing executable instructions of the processor, Further, the processor is configured to: receive terminal information of the terminal sent by a source base station in response to determining that the terminal performs cell handover; wherein the terminal information includes terminal environment UE context of the terminal and a measurement result of the terminal; and return a handover command of the candidate cell to the source base station, where the handover command includes aggregation configuration information of the candidate cell.

According to a seventh aspect of the present disclosure, there is provided a computer-readable storage medium including executable instructions, and a processor in a terminal causes the executable instructions to implement methods for establishing an aggregation connection according to the first aspect or any implementation of the first aspect.

According to an eighth aspect of the present disclosure, there is provided a computer-readable storage medium including executable instructions, and a processor in a terminal causes the executable instructions to implement methods for establishing an aggregation connection according to the second aspect or any implementation of the second aspect.

According to a ninth aspect of the present disclosure, there is provided a computer-readable storage medium including executable instructions, and a processor in a terminal causes the executable instructions to implement methods for establishing an aggregation connection according to the third aspect or any implementation of the third aspect.

It should be noted that the above general description and the following detailed description are merely exemplary and should not be construed as limiting of the present disclosure.

BRIEF DESCRIPTION OF THE DRAWINGS

The drawings herein are incorporated into the specification and constitute a part of the specification, show embodiments in accordance with the present disclosure, and are used to explain the principle of the present disclosure together with the specification.

DETAILED DESCRIPTION

The embodiments will be described in detail here, and examples thereof are shown in the accompanying drawings. When the following description refers to the drawings, unless otherwise indicated, the same numbers in different drawings indicate the same or similar elements. The implementation manners described in the following embodiments do not represent all implementation manners consistent with the present disclosure. On the contrary, they are merely examples of apparatuses and methods consistent with some aspects of the present disclosure as detailed in the appended claims.

It should be understood that the "several" mentioned in this text refers to one or more, and the "plurality" refers to two or more. "And/or" describes the association relationship of the associated objects, indicating that there can be three types of relationships. For example, A and/or B can mean: A alone exists, A and B exist at the same time, and B exists alone. The character "/" generally indicates that the associated objects in front and behind are in an "or" relationship.

To facilitate understanding, some terms and application scenarios involved in the present disclosure are briefly introduced below.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

The present disclosure provides a solution for establishing an aggregation connection after a terminal switches a cell. For ease of understanding, the following first introduces some concepts involved in the present disclosure.

(1) Aggregation Technology and Aggregation Connection

In order to increase the data transmission rate, the 4th Generation mobile communication technology (4G) system, also known as the Long Term Evolution (LTE) system, introduces aggregation technology, including Carrier Aggregation (CA) technology, Dual Connectivity (DC) technology, LTE-Wireless Local Area Networks AggregaTIon (LWA) technology, etc., so that the terminal can simultaneously transmit data on a plurality of carrier frequencies. Each cell sets the CA/DC/LWA configuration for the terminal according to its own deployment, including the carrier frequency used by CA, the cell used by DC, and the WLAN access point (AP) used by LWA, or the like.

Among them, the wireless connection established based on aggregation technology can be called aggregation connection, including CA connection based on carrier aggregation CA technology, DC connection based on dual connectivity DC technology, or LWA connection based on LTE-Wireless Local Area Networks AggregaTIon technology, or the like.

(2) CHO Command

In order to improve robustness of the handover, the 5th generation mobile communication (5G) technology, also known as New Radio (NR) technology, proposes a conditional handover CHO. The handover command sent in this process is called CHO command. That is, the network can send a CHO command to the terminal in advance, which carries the handover target cell and handover trigger condition. When the handover trigger condition is met, the UE initiates the handover process by itself, and the network does not need to send the handover command.

(3) Source Cell, Target Cell, Candidate Cell, Source Base Station and Target Base Station In the present disclosure, as for a terminal, the cell that the terminal accesses before the cell handover may be referred to as the source cell of the terminal, and the base station corresponding to the source cell may be referred to as the source base station.

During the handover, the terminal can select a cell from one or more cells for handover, where the one or more cells can be referred to as candidate cells, and the cell to which the terminal selects to be handed over can be referred to as the target cell of the terminal. The base station corresponding to the target cell may be referred to as a target base station.

Figure 1:
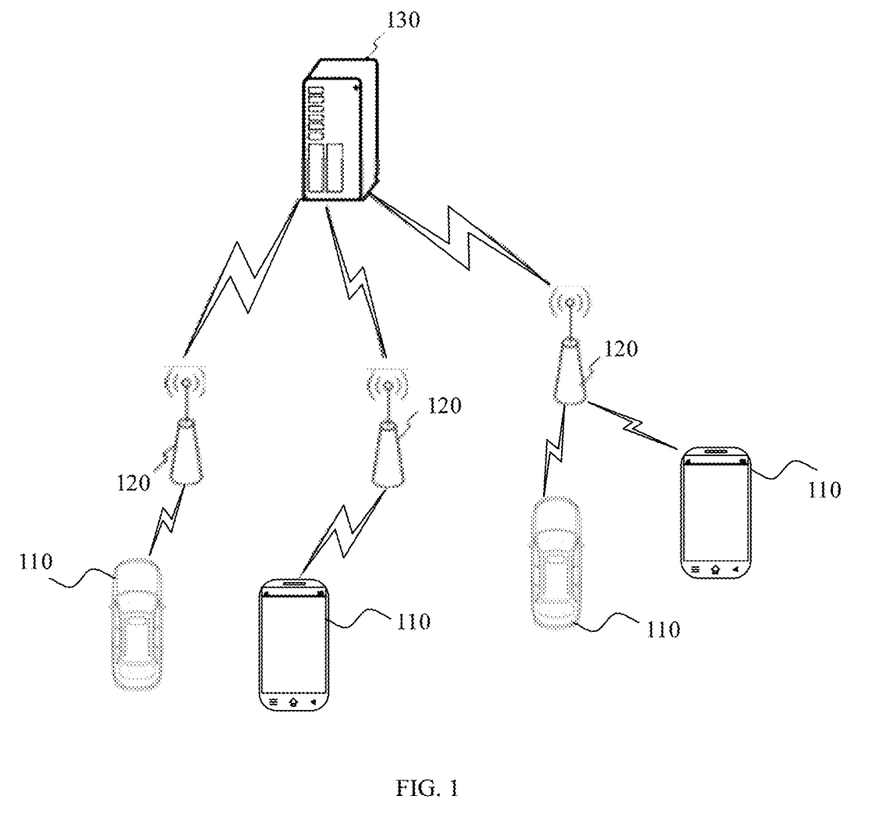
FIG. 1 is a schematic diagram of an implementation environment involved in a method for establishing an aggregation connection provided by an embodiment of the present disclosure.

Please refer to FIG. 1, which shows a schematic diagram of an implementation environment involved in a method for establishing an aggregation connection provided by an embodiment of the present disclosure. As shown in FIG. 1, the implementation environment may include: a number of terminals 110 and a number of base stations 120.

The terminal 110 is a wireless communication device supporting one or multiple wireless access technologies. For example, the terminal 110 may support cellular mobile communication technology, for example, it may support 4G technology and 5G technology. Alternatively, the terminal 110 may also support a next-generation mobile communication technology of the 5G technology.

For example, the terminal 210 may also be a user terminal device, such as a mobile phone (or "cellular" phone) and a computer with a mobile terminal. For example, it may be a portable, pocket-sized, handheld, built-in computer or in-vehicle mobile device, for example, Station (STA), subscriber unit, subscriber station, mobile station, mobile, remote station, access point, remote terminal, access terminal, user terminal, user agent, user device, or user equipment (UE). Specifically, for example, the terminal 210 may be a mobile terminal such as a smart phone, a tablet computer, and an e-book reader, or may be a smart wearable device such as smart glasses, a smart watch, or a smart bracelet.

Alternatively, the terminal 110 may be an in-vehicle communication device, for example, it may be a trip computer with a wireless communication function, or a wireless communication device external to the trip computer.

Alternatively, the terminal 110 may also be a roadside device, for example, it may be a street lamp, signal lamp or other roadside devices with a wireless communication function.

The base station 120 may be a network side device in a wireless communication system. Among them, the wireless communication system may be a fourth-generation mobile communication technology system, also known as a long-term evolution LTE system; or, the wireless communication system may also be a 5G system, also known as a New Radio NR system. Alternatively, the wireless communication system may also be the next-generation system of the 5G system.

Among them, the base station 120 may be an evolved base station (eNB) used in a 4G system. Alternatively, the base station 120 may also be a base station (gNB) adopting a centralized and distributed architecture in the 5G system. When the base station 220 adopts a centralized distributed architecture, it usually includes a central unit (CU) and at least two distributed units (DU). The central unit is provided with protocol stack of a Media Access Control (MAC) layer, a Radio Link Control (RLC) layer, and a Packet Data Convergence Protocol (PDCP) layer; the distributed unit is provided with a Physical (PHY) layer protocol stack, and the embodiment of the present disclosure does not limit the specific implementation manner of the base station 220.

A wireless connection can be established between the base station 120 and the terminal 110 through a wireless air interface. In different embodiments, the wireless air interface is a wireless air interface based on the fourth-generation mobile communication network technology (4G) standard; or, the wireless air interface is a wireless air interface based on the fifth-generation mobile communication network technology (5G) standard, such as the wireless air interface is a new radio; or, the wireless air interface may also be a wireless air interface based on the next-generation mobile communication network technology standard of the 5G technology.

In some embodiments, the foregoing wireless communication system may further include a network management device 130.

Several base stations 120 are connected to the network management device 130 respectively. The network management device 130 may be a core network device in a wireless communication system. For example, the network management device 130 may be a Mobility Management Entity (MME) in an Evolved Packet Core (EPC). Alternatively, the network management device may also be other core network devices, such as a Serving GateWay (SGW), a Public Data Network GateWay (PGW), and a Policy and Charging Rules Function (PCRF) or Home Subscriber Server (HSS), or the like. The implementation form of the network management device 130 is not limited in the embodiment of the present disclosure.

In the implementation environment shown in FIG. 1 above, each base station 120 may correspond to one or more cells, and the terminal 110 may access the cell to implement network communication. When the terminal 110 is moving, it can switch between various cells to obtain higher communication quality.

In the solution shown in the subsequent embodiments of the present disclosure, when the terminal communicates with the network based on the aggregation technology and the cell handover occurs, it can establish a new aggregation connection while performing the cell handover according to the CHO command, so that the aggregation technology can be used for data transmission immediately after successfully accessing the target cell, thereby increasing the data transmission rate during the cell handover through the CHO command.

Figure 2:
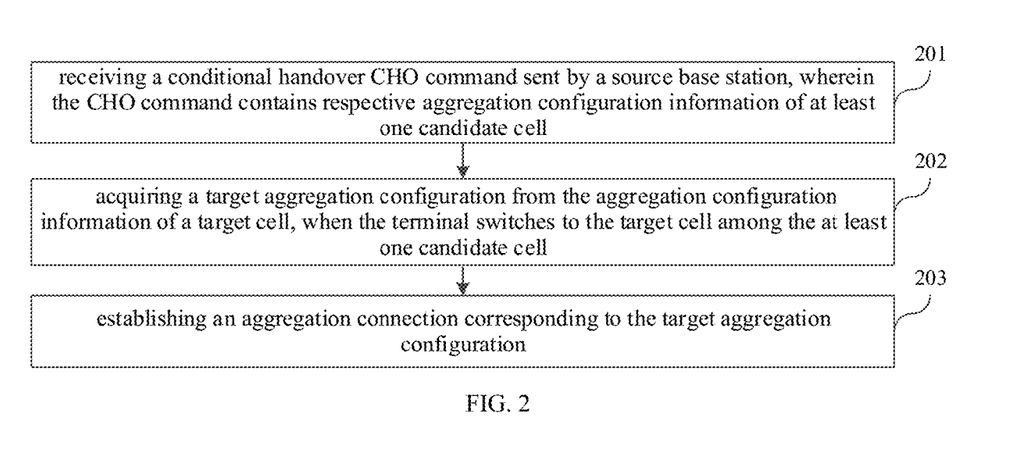
FIG. 2 is a method flowchart of a method for establishing an aggregation connection provided by an embodiment of the present disclosure.

Please refer to FIG. 2, which shows a method flowchart of a method for establishing an aggregation connection provided by an embodiment of the present disclosure. As shown in FIG. 2, the method for establishing an aggregation connection can be applied to the implementation environment shown in FIG. 1, and executed by the terminal in the implementation environment. The method for establishing an aggregation connection may include the following steps:

step 201, receiving a conditional handover CHO command sent by a source base station, wherein the CHO command contains respective aggregation configuration information of at least one candidate cell;

step 202, acquiring a target aggregation configuration from the aggregation configuration information of a target cell, when the terminal switches to the target cell among the at least one candidate cell; and step 203, establishing an aggregation connection corresponding to the target aggregation configuration.

In some embodiments, the aggregation connection includes a connection based on carrier aggregation CA, Dual Connectivity DC, or a connection based on LTE-Wireless Local Area Networks AggregaTIon LWA technology.

In some embodiments, the aggregation configuration information of each of the candidate cells includes at least one aggregation configuration, and the aggregation configuration contains a timer;

before acquiring a target aggregation configuration from the aggregation configuration information of a target cell when the terminal switches to the target cell among the at least one candidate cell, the method further includes:

starting the timer of each aggregation configuration in respective aggregation configuration information of the at least one candidate cell;

the acquiring a target aggregation configuration from the aggregation configuration information of a target cell when the terminal switches to the target cell among the at least one candidate cell includes:

acquiring the target aggregation configuration from each effective aggregation configuration when the terminal switches to the target cell among the at least one candidate cell, wherein the effective aggregation configuration is an aggregation configuration that the timer has not expired in the aggregation configuration information of the target cell.

In some embodiments, the method further includes:

as for a first aggregation configuration, when the timer of the first aggregation configuration expires, deleting the first aggregation configuration, wherein the first aggregation configuration is any aggregation configuration in the respective aggregation configuration information of the at least one candidate cell.

In some embodiments, the aggregation configuration further contains a bearer configuration, a measurement configuration, and a signal quality threshold; the bearer configuration is configured to indicate a radio bearer of a corresponding aggregation configuration, and the measurement configuration is configured to indicate a reference signal type and a signal quality type of the corresponding aggregation configuration;

the acquiring the target aggregation configuration from each effective aggregation configuration includes:

measuring and acquiring a signal quality of each effective aggregation configuration according to a bearer configuration of each effective aggregation configuration and a measurement configuration of each effective aggregation configuration;

acquiring an aggregation configuration whose signal quality is higher than a corresponding signal quality threshold among each effective aggregation configuration as the target aggregation configuration.

In some embodiments, when the aggregation configuration whose signal quality is higher than the corresponding signal quality threshold among each effective aggregation configuration includes at least two aggregation configurations, the acquiring an aggregation configuration whose signal quality is higher than a corresponding signal quality threshold among each effective aggregation configuration as the target aggregation configuration includes:

acquiring, among the at least two aggregation configurations, the one arranged first in the aggregation configuration information of the target cell, as the target aggregation configuration; or acquiring a random one of the at least two aggregation configurations as the target aggregation configuration.

In some embodiments, the method further includes:

deleting other aggregation configurations whose timers have not expired except for the target aggregation configuration, among the respective aggregation configuration information of the at least one candidate cell, after establishing the aggregation connection corresponding to the target aggregation configuration.

In some embodiments, the method further includes:

sending bearer information of the aggregation connection to a target base station after establishing the aggregation connection corresponding to the target aggregation configuration, wherein the target base station is a base station corresponding to the target cell;

wherein, when the aggregation connection is a connection based on Carrier Aggregation CA or Dual Connectivity DC, the bearer information includes a secondary cell identifier; when the aggregation connection is a connection based on LWA, the bearer information includes a wireless local area network access point identifier.

To sum up, in the solution shown in the embodiment of the present disclosure, the terminal receives the conditional handover CHO command sent by a source base station before performing the cell handover, wherein the CHO command contains respective aggregation configuration information of at least one candidate cell; when the terminal switches to a target cell, it can directly acquire a target aggregation configuration from the aggregation configuration information of the target cell; and establish an aggregation connection based on the target aggregation configuration. In this process, there is no need to wait for the target cell to set the aggregation configuration after switching to the target cell, and establishment of the aggregation connection may be completed during the handover process, so that the aggregation technology can be used for data transmission immediately after successfully accessing the target cell, thereby increasing the data transmission rate during the cell handover through the CHO command.

Figure 3:
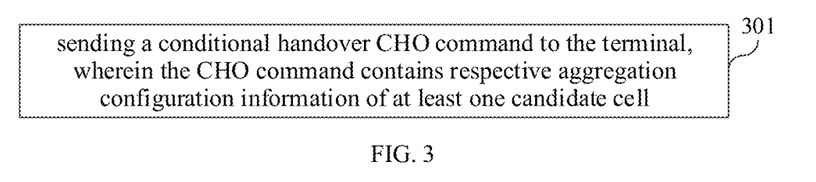
FIG. 3 is a method flowchart of a method for establishing an aggregation connection provided by an embodiment of the present disclosure.

Please refer to FIG. 3, which shows a method flowchart of a method for establishing an aggregation connection provided by an embodiment of the present disclosure. As shown in FIG. 3, the method for establishing an aggregation connection can be applied to the implementation environment shown in FIG. 1, and executed by a source base station when a terminal performs cell handover in the implementation environment. The method for establishing an aggregation connection may include the following step:

step 301, sending a conditional handover CHO command to the terminal, wherein the CHO command contains respective aggregation configuration information of at least one candidate cell.

In some embodiments, the aggregation configuration information of each of the candidate cells includes at least one aggregation configuration, and the aggregation configuration contains a timer.

In some embodiments, the aggregation configuration further contains a bearer configuration, a measurement configuration, and a signal quality threshold; the bearer configuration is configured to indicate a radio bearer of a corresponding aggregation configuration, and the measurement configuration is configured to indicate a reference signal type and a signal quality type of the corresponding aggregation configuration.

In some embodiments, before sending a conditional handover CHO command to the terminal, the method further includes:

sending terminal information of the terminal to respective base stations corresponding to the at least one candidate cell, wherein the terminal information includes terminal environment UE context of the terminal and a measurement result of the terminal;

receiving a handover command returned by each of the at least one candidate cell, wherein the handover command includes aggregation configuration information of the corresponding candidate cell;

generating the CHO command according to the handover command returned by each of the at least one candidate cell.

To sum up, in the solution shown in the embodiment of the present disclosure, before the terminal performs the cell handover, the source base station sends a CHO command to the terminal, wherein the CHO command contains respective aggregation configuration information of at least one candidate cell, such that when the terminal switches to a target cell, it can directly acquire a target aggregation configuration from the aggregation configuration information of the target cell, and establish an aggregation connection based on the target aggregation configuration. In this process, there is no need for the terminal to wait for the target cell to set the aggregation configuration after switching to the target cell, and establishment of the aggregation connection may be completed during the handover process, so that the aggregation technology can be used for data transmission immediately after successfully accessing the target cell, thereby increasing the data transmission rate during the cell handover through the CHO command.

Figure 4:
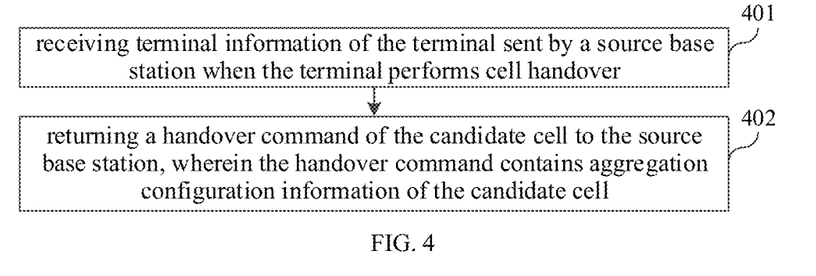
FIG. 4 is a method flowchart of a method for establishing an aggregation connection provided by an embodiment of the present disclosure.

Please refer to FIG. 4, which shows a method flowchart of a method for establishing an aggregation connection provided by an embodiment of the present disclosure. As shown in FIG. 4, the method for establishing an aggregation connection can be applied to the implementation environment shown in FIG. 1, and executed by a base station corresponding to a candidate cell when a terminal performs cell handover in the implementation environment. The method for establishing an aggregation connection may include the following steps:

step 401, receiving terminal information of the terminal sent by a source base station when the terminal performs cell handover; wherein the terminal information includes terminal environment UE context of the terminal and a measurement result of the terminal; and step 402, returning a handover command of the candidate cell to the source base station, wherein the handover command contains aggregation configuration information of the candidate cell.

In some embodiments, the aggregation configuration information of the candidate cell includes at least one aggregation configuration, and the aggregation configuration contains a timer.

In some embodiments, wherein the aggregation configuration further contains a bearer configuration, a measurement configuration, and a signal quality threshold; the bearer configuration is configured to indicate a radio bearer of a corresponding aggregation configuration, and the measurement configuration is configured to indicate a reference signal type and a signal quality type of the corresponding aggregation configuration.

In some embodiments, the method further includes:
receiving bearer information of an aggregation connection sent by the terminal, after the terminal establishes the aggregation connection corresponding to a target aggregation configuration in the aggregation configuration information of the candidate cell;
wherein, when the aggregation connection is a connection based on CA or DC, the bearer information includes a secondary cell identifier; when the aggregation connection is a connection based on LWA, the bearer information includes a wireless local area network access point identifier.

To sum up, in the solution shown in the embodiment of the present disclosure, before the terminal performs cell handover, the base station corresponding to the candidate cell sends a handover command containing the aggregation configuration information of the candidate cell to the source base station according to the terminal information sent by the source base station. The source base station generates a CHO command containing respective aggregation configuration information of at least one candidate cell and sends it to the terminal, so that the terminal can directly acquire the target aggregation configuration from the aggregation configuration information of the target cell when switching to the target cell, and establish an aggregation connection based on the target aggregation configuration. In this process, there is no need for the terminal to wait for the target cell to set the aggregation configuration after switching to the target cell, and establishment of the aggregation connection may be completed during the handover process, so that the aggregation technology can be used for data transmission immediately after successfully accessing the target cell, thereby increasing the data transmission rate during the cell handover through the CHO command.

Figure 5:
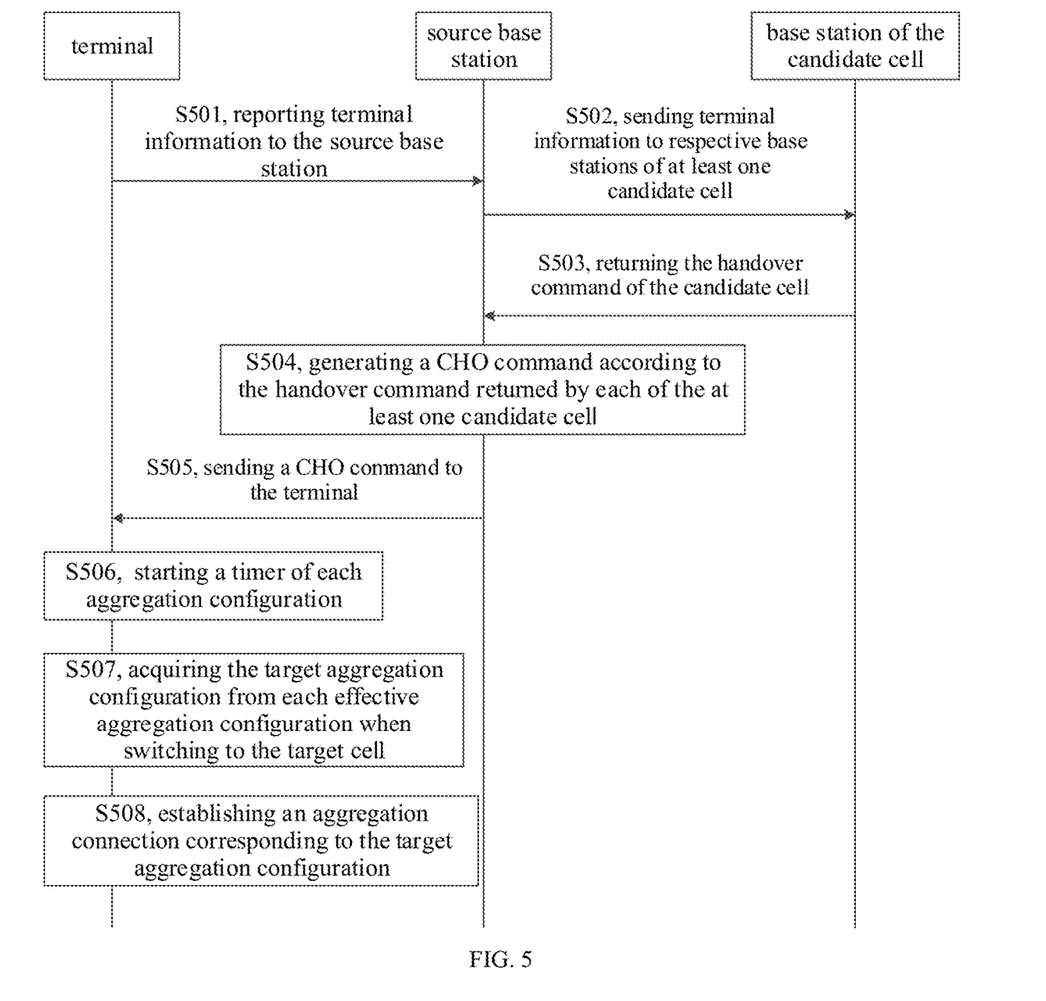
FIG. 5 is a method flowchart of a method for establishing an aggregation connection provided by an embodiment of the present disclosure.

Please refer to FIG. 5, which shows a method flowchart of a method for establishing an aggregation connection provided by an embodiment of the present disclosure. As shown in FIG. 5, the method for establishing an aggregation connection can be applied to the implementation environment shown in FIG. 1. The method for establishing an aggregation connection may include the following steps.

In step 501, the terminal reports terminal information to the source base station, and the source base station receives the terminal information of the terminal; the terminal information includes the terminal environment UE context of the terminal and the measurement result of the terminal.

Among them, the terminal environment UE context includes the configuration of the radio access layer of the terminal, such as the radio bearer configuration or the like.

The above-mentioned measurement result of the terminal may be the measurement result of the terminal on the surrounding cells and/or WLAN APs, for example, the measurement target (that is, the identity of each cell or the identity of each WLAN AP), and the signal strength, or the like.

When the terminal accesses the source cell in the source base station, it also measures the signal quality of WLAN APs or other cells expect for the source cell, and reports the acquired measurement results and its own UE context to the source base station.

In step 502, the source base station sends the terminal information of the terminal to the base station respectively corresponding to at least one candidate cell, and the base station corresponding to the candidate cell receives the terminal information.

After receiving the terminal information reported by the terminal, the source base station may send the terminal information to the respective base stations of at least one candidate cell to which the terminal may be handed over.

The aforementioned at least one candidate cell may be each cell for which the corresponding measurement result is included in the terminal information.

Alternatively, the aforementioned at least one candidate cell may also be one or more cells selected by the base station according to the measurement result in the terminal information.

Alternatively, the aforementioned at least one candidate cell may also be one or more cells designated by the terminal according to the measurement result.

In step 503, the base station of the candidate cell returns the handover command of the candidate cell to the source base station, and the source base station receives the handover command.

The handover command includes the aggregation configuration information of the candidate cell.

In the embodiment of the present disclosure, after the base station of the candidate cell receives the terminal information sent by the source base station, it judges whether to accept the terminal to switch to this cell according to the UE context in the terminal information, and after judging that it can accept the terminal to switch to this cell, the aggregation configuration information of the candidate cell is generated according to the measurement results of the terminal on the WLAN APs or other cells expect for the candidate cell in the terminal information, and the aggregation configuration information of the candidate cell is added to the handover command and returned to the source base station.

In some embodiments, the aggregation configuration information of the candidate cells includes at least one aggregation configuration, and the aggregation configuration contains a timer.

In some embodiments, the aggregation configuration further contains a bearer configuration, a measurement configuration, and a signal quality threshold; the bearer configuration is configured to indicate a radio bearer of a corresponding aggregation configuration, and the measurement configuration is configured to indicate a reference signal type and a signal quality type of the corresponding aggregation configuration.

The aggregation configuration information generated by a candidate cell for the terminal may include one or more aggregation configurations, and as for different aggregation technologies, the corresponding aggregation configurations are also different.

For example, when the candidate cell supports dual-connected DC technology, the handover command returned by the candidate cell can carry a DC configuration list (corresponding to the above aggregation configuration information), and the DC configuration list contains one or more DC configurations (corresponding to the above aggregation configuration). Each DC configuration includes a bearer configuration, a measurement configuration, a signal quality threshold and a timer. The bearer configuration includes frequency, secondary cell identifier, etc.; the measurement configuration includes a reference signal type, such as Synchronization Signal Block (SSB), Channel State Information-Reference Signal (CSI-RS), etc.; the signal quality type, also known as the measurement variable, includes such as Reference Signal Receiving Power (RSRP), Reference Signal Receiving Quality (RSRQ), CSI-Signal to Interference plus Noise Ratio (CSI-SINR), or the like.

For another example, when a candidate cell supports carrier aggregation CA technology, the handover command returned by the candidate cell can carry a CA configuration list (corresponding to the above aggregation configuration information), which contains one or more CA configurations (corresponding to the above aggregation configuration), each CA configuration includes a bearer configuration, a measurement configuration, a signal quality threshold and a timer. The bearer configuration includes frequency, secondary cell identifier, etc., the measurement configuration includes a reference signal type, such as SSB, CSI-RS, etc.; the measurement variable includes, such as RSRP, RSRQ, CSI-SINR, or the like.

For another example, when the candidate cell supports the LWA technology, the handover command returned by the candidate cell can carry the LWA configuration list (corresponding to the above aggregation configuration information), which contains one or more LWA configurations (corresponding to the above aggregation configuration), and each LWA configuration includes a bearer configuration, a measurement configuration, a signal quality threshold and a timer. The bearer configuration includes a WLAN AP identifier, etc.; the measurement configuration includes a reference signal type, such as SSB, CSI-RS, etc.; and the measurement variable includes such as RSRP, RSRQ, CSI-SINR, or the like.

In step 504, the source base station generates a CHO command according to the handover command returned by each of the at least one candidate cell.

In this step, the source base station generates a CHO command containing the aggregation configuration information of each candidate cell according to the handover command of each candidate cell returned by the base station respectively corresponding to each candidate cell.

In step 505, the source base station sends a CHO command to the terminal, and the terminal receives the CHO command.

In the embodiment of the present disclosure, after the source base station generates the above-mentioned CHO command, it can send the CHO command to the terminal, so that the terminal executes the initiation of cell handover when it detects that the handover condition corresponding to the CHO command is satisfied.

In step 506, the terminal starts the timer of each aggregation configuration in respective aggregation configuration information of the at least one candidate cell.

After receiving the above-mentioned CHO command, the terminal can start the timer of each aggregation configuration in the CHO command.

In some embodiments, as for a first aggregation configuration, when the timer of the first aggregation configuration expires, the terminal deletes the first aggregation configuration, wherein the first aggregation configuration is any aggregation configuration in the respective aggregation configuration information of the at least one candidate cell.

In other words, the UE can start the timer corresponding to each aggregation configuration immediately after receiving the CHO command, and when a certain timer expires, the corresponding aggregation configuration is deleted.

In step 507, when the terminal switches to the target cell among at least one candidate cell, the target aggregation configuration is acquired from each effective aggregation configuration.

The above effective aggregation configuration is an aggregation configuration in the aggregation configuration information of the target cell whose timer has not expired.

When the terminal selects the target cell in at least one candidate cell for handover according to the handover condition in the CHO command and the measurement results of the terminal itself on respective candidate cells, it can select a configuration to establish an aggregation connection from respective aggregation configuration corresponding to the target cell whose timers have not expired, so that the aggregation technology can be used for data transmission immediately after the handover is completed.

In a possible implementation manner, when acquiring the target aggregation configuration from respective effective aggregation configuration corresponding to the target cell, the terminal may measure and acquire a signal quality of each effective aggregation configuration according to a bearer configuration of each effective aggregation configuration and a measurement configuration of each effective aggregation configuration; and acquire an aggregation configuration whose signal quality is higher than a corresponding signal quality threshold among each effective aggregation configuration as the target aggregation configuration.

That is, in the embodiment of the present disclosure, after the UE selects a target cell to trigger CHO handover, it can measure the channel quality of the secondary cell/WLAN AP according to the corresponding configuration, and select the secondary cell/WLAN AP configuration that meets the signal quality threshold requirement and ones that have not been deleted (that is, the timer has not expired), to establish an aggregation connection.

In some embodiments, when the aggregation configuration whose signal quality is higher than the corresponding signal quality threshold among each effective aggregation configuration includes at least two aggregation configurations, the terminal may acquire, among the at least two aggregation configurations, the one arranged first in the aggregation configuration information of the target cell, as the target aggregation configuration.

In other words, when multiple secondary cells/WLAN APs corresponding to the target cell meet the requirement, the terminal can select the front aggregation configuration as the target aggregation configuration in the order of the list.

Alternatively, the terminal may also acquire a random one of the at least two aggregation configurations as the target aggregation configuration.

In other words, when multiple secondary cells/WLAN APs corresponding to the target cell meet the requirement, the terminal can also randomly select one of them to configure as the target aggregation configuration.

In step 508, the terminal establishes an aggregation connection corresponding to the target aggregation configuration.

In the embodiment of the present disclosure, the terminal may establish a corresponding aggregation connection according to the bearer configuration in the target aggregation configuration.

For example, when the target aggregation configuration is a CA configuration, the aggregation connection is a connection based on carrier aggregation CA technology; when the target aggregation configuration is a DC configuration, the aggregation connection is a connection based on dual connectivity DC technology; when the target aggregation configuration is a LWA configuration, the aggregation connection is a connection based on LTE-Wireless Local Area Networks AggregaTIon LWA technology.

In a possible implementation manner, after establishing the aggregation connection corresponding to the target aggregation configuration, the terminal also deletes other aggregation configurations whose timers have not expired except for the target aggregation configuration, among the respective aggregation configuration information of the at least one candidate cell.

In a possible implementation manner, the terminal further sends bearer information of the aggregation connection to a target base station after establishing the aggregation connection corresponding to the target aggregation configuration, wherein the target base station is a base station corresponding to the target cell; wherein, when the aggregation connection is a connection based on Carrier Aggregation CA or Dual Connectivity DC, the bearer information includes a secondary cell identifier; when the aggregation connection is a connection based on LWA, the bearer information includes a wireless local area network access point identifier.

That is, after the UE handover is completed, the UE sends a reconfiguration complete message to the target base station, wherein the reconfiguration complete message carries the secondary cell/WLAN AP identifier selected when the aggregation connection is established in the above steps, and deletes other unused aggregation configuration.

In a possible implementation, the process of establishing the aggregation connection may be as follows.

1) After the UE reports the measurement results to the source base station, the source base station sends a handover request to the base stations where each candidate cell is located (such as base station a and base station b). The handover request carries the UE context and the UE's measurement results for each cell.

2) Base station a sends a handover command to the source base station, which carries the DC configuration list as follows:

DC configuration 1: the secondary cell ID is 000, the frequency is 100, the reference signal is SSB, the measurement variable is RSRP, the threshold is −98 db, and the timer is 1 s.

DC configuration 2: the secondary cell ID is 001, the frequency is 101, the reference signal is SSB, the measurement variable is RSRP, the threshold is −98 db, and the timer is 1.5 s.

3) Base station b sends a handover command to the source base station, which carries the CA configuration list as follows:

CA configuration 1: the secondary cell ID is 010, the frequency is 110, the reference signal is SSB, the measurement variable is RSRP, the threshold is −98 db, and the timer is 1 s.

CA configuration 2: the secondary cell identifier is 011, the frequency is 111, the reference signal is SSB, the measurement variable is RSRP, the threshold is −98 db, and the timer is 1.5 s.

4) The source base station generates a CHO command based on the received handover command and sends it to the UE.

5) After the UE receives the handover command, it starts respective timers of the above four aggregation configurations.

6) The UE decides to initiate a handover to cell a (that is, the cell corresponding to the base station a), and then measures the SSB of cell 000 on frequency 100 and measures the SSB of cell 001 on frequency 101. The measurement results are −97 db and −100 db respectively, where the secondary cell 000 meets the signal quality threshold, the bearer of the secondary cell 000 is established according to DC configuration 1, for subsequent data transmission.

7) After the handover is completed, the UE sends a reconfiguration complete message to cell a, which carries the secondary cell identifier 000.

To sum up, in the solution shown in the embodiment of the present disclosure, before the terminal performs the cell handover, the source base station sends a CHO command to the terminal, wherein the CHO command contains respective aggregation configuration information of at least one candidate cell, such that when the terminal switches to a target cell, it can directly acquire a target aggregation configuration from the aggregation configuration information of the target cell, and establish an aggregation connection based on the target aggregation configuration. In this process, there is no need for the terminal to wait for the target cell to set the aggregation configuration after switching to the target cell, and establishment of the aggregation connection may be completed during the handover process, so that the aggregation technology can be used for data transmission immediately after successfully accessing the target cell, thereby increasing the data transmission rate during the cell handover through the CHO command.

The following are apparatus embodiments of the present disclosure, which can be used to implement the method embodiments of the present disclosure. For details that are not disclosed in the apparatus embodiments of the present disclosure, please refer to the method embodiments of the present disclosure.

Figure 6:
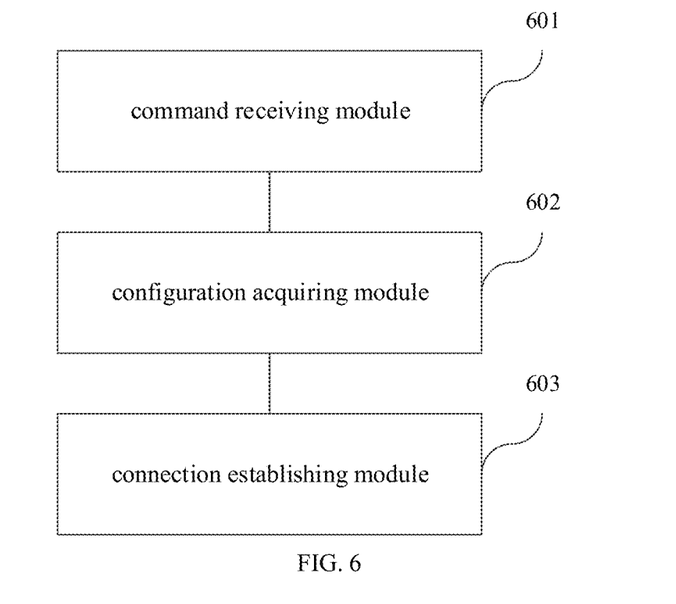
FIG. 6 is a block diagram showing an apparatus for establishing an aggregation connection according to an embodiment.

FIG. 6 is a block diagram showing an apparatus for establishing an aggregation connection according to an embodiment. As shown in FIG. 6, the apparatus for establishing an aggregation connection may be implemented as all or part of the terminal in the implementation environment shown in FIG. 1 through hardware or a combination of software and hardware, so as to perform the steps executed by the terminal in any of the embodiments shown in FIG. 2 or FIG. 5. The apparatus includes:

a command receiving module 601, configured to receive a conditional handover CHO command sent by a source base station, wherein the CHO command contains respective aggregation configuration information of at least one candidate cell;

a configuration acquiring module 602, configured to acquire a target aggregation configuration from the aggregation configuration information of a target cell, when the terminal switches to the target cell among the at least one candidate cell; and a connection establishing module 603, configured to establish an aggregation connection corresponding to the target aggregation configuration.

In some embodiments, the aggregation configuration information of each of the candidate cells includes at least one aggregation configuration, and the aggregation configuration contains a timer;

the apparatus further includes:

a timer starting module, configured to start the timer of each aggregation configuration in respective aggregation configuration information of the at least one candidate cell, before the configuration acquiring module acquires a target aggregation configuration from the aggregation configuration information of the target cell;

wherein the configuration acquiring module is configured to acquire the target aggregation configuration from each effective aggregation configuration when the terminal switches to the target cell among the at least one candidate cell, wherein the effective aggregation configuration is an aggregation configuration that the timer has not expired in the aggregation configuration information of the target cell.

In some embodiments, the apparatus further includes:

a first deleting module, configured to, as for a first aggregation configuration, when the timer of the first aggregation configuration expires, delete the first aggregation configuration, wherein the first aggregation configuration is any aggregation configuration in the respective aggregation configuration information of the at least one candidate cell.

In some embodiments, the aggregation configuration further contains a bearer configuration, a measurement configuration, and a signal quality threshold; the bearer configuration is configured to indicate a radio bearer of a corresponding aggregation configuration, and the measurement configuration is configured to indicate a reference signal type and a signal quality type of the corresponding aggregation configuration;

the configuration acquiring module 602 includes:

a measuring sub-module, configured to measure and acquire a signal quality of each effective aggregation configuration according to a bearer configuration of each effective aggregation configuration and a measurement configuration of each effective aggregation configuration;

an acquiring sub-module, configured to acquire an aggregation configuration whose signal quality is higher than a corresponding signal quality threshold among each effective aggregation configuration as the target aggregation configuration.

In some embodiments, the acquiring sub-module is configured to, when the aggregation configuration whose signal quality is higher than the corresponding signal quality threshold among each effective aggregation configuration includes at least two aggregation configurations, acquire, among the at least two aggregation configurations, the one arranged first in the aggregation configuration information of the target cell, as the target aggregation configuration; or acquire a random one of the at least two aggregation configurations as the target aggregation configuration.

In some embodiments, the apparatus further includes:

a second deleting module, configured to delete other aggregation configurations whose timers have not expired except for the target aggregation configuration, among the respective aggregation configuration information of the at least one candidate cell, after establishing the aggregation connection corresponding to the target aggregation configuration.

In some embodiments, the apparatus further includes:

a bearer information sending module, configured to send bearer information of the aggregation connection to a target base station after establishing the aggregation connection corresponding to the target aggregation configuration, wherein the target base station is a base station corresponding to the target cell;

wherein, when the aggregation connection is a connection based on CA or DC, the bearer information includes a secondary cell identifier; when the aggregation connection is a connection based on LWA, the bearer information includes a wireless local area network access point identifier.

To sum up, in the solution shown in the embodiment of the present disclosure, the terminal receives the conditional handover CHO command sent by a source base station before performing the cell handover, wherein the CHO command contains respective aggregation configuration information of at least one candidate cell; when the terminal switches to a target cell, it can directly acquire a target aggregation configuration from the aggregation configuration information of the target cell; and establish an aggregation connection based on the target aggregation configuration. In this process, there is no need to wait for the target cell to set the aggregation configuration after switching to the target cell, and establishment of the aggregation connection may be completed during the handover process, so that the aggregation technology can be used for data transmission immediately after successfully accessing the target cell, thereby increasing the data transmission rate during the cell handover through the CHO command.

Figure 7:
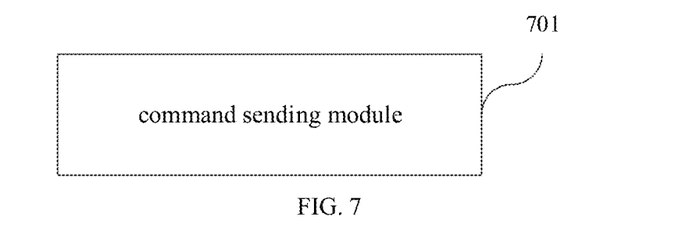
FIG. 7 is a block diagram showing an apparatus for establishing an aggregation connection according to an embodiment.

FIG. 7 is a block diagram showing an apparatus for establishing an aggregation connection according to an embodiment. As shown in FIG. 7, the apparatus for establishing an aggregation connection may be implemented as all or part of the base station in the implementation environment shown in FIG. 1 through hardware or a combination of software and hardware, so as to perform the steps executed by the source base station in any of the embodiments shown in FIG. 3 or FIG. 5. The apparatus includes:

a command sending module 701, configured to send a conditional handover CHO command to the terminal, wherein the CHO command contains respective aggregation configuration information of at least one candidate cell.

In some embodiments, the aggregation configuration information of each of the candidate cells includes at least one aggregation configuration, and the aggregation configuration contains a timer.

In some embodiments, the aggregation configuration further contains a bearer configuration, a measurement configuration, and a signal quality threshold; the bearer configuration is configured to indicate a radio bearer of a corresponding aggregation configuration, and the measurement configuration is configured to indicate a reference signal type and a signal quality type of the corresponding aggregation configuration.

In some embodiments, the apparatus further includes:
- a measurement result sending module, configured to send terminal information of the terminal to respective base stations corresponding to the at least one candidate cell before the command sending module sends a conditional handover CHO command to the terminal, wherein the terminal information includes terminal environment UE context of the terminal and a measurement result of the terminal;
- a command receiving module, configured to receive a handover command returned by each of the at least one candidate cell, wherein the handover command includes aggregation configuration information of the corresponding candidate cell;
- a command generating module, configured to generate the CHO command according to the handover command returned by each of the at least one candidate cell.

To sum up, in the solution shown in the embodiment of the present disclosure, before the terminal performs the cell handover, the source base station sends a CHO command to the terminal, wherein the CHO command contains respective aggregation configuration information of at least one candidate cell, such that when the terminal switches to a target cell, it can directly acquire a target aggregation configuration from the aggregation configuration information of the target cell, and establish an aggregation connection based on the target aggregation configuration. In this process, there is no need for the terminal to wait for the target cell to set the aggregation configuration after switching to the target cell, and establishment of the aggregation connection may be completed during the handover process, so that the aggregation technology can be used for data transmission immediately after successfully accessing the target cell, thereby increasing the data transmission rate during the cell handover through the CHO command.

Figure 8:
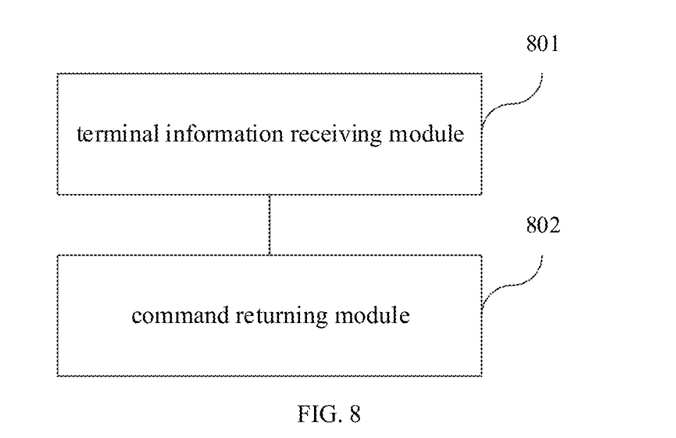
FIG. 8 is a block diagram showing an apparatus for establishing an aggregation connection according to an embodiment.

FIG. 8 is a block diagram showing an apparatus for establishing an aggregation connection according to an embodiment. As shown in FIG. 8, the apparatus for establishing an aggregation connection may be implemented as all or part of the base station in the implementation environment shown in FIG. 1 through hardware or a combination of software and hardware, so as to perform the steps executed by the base station in the candidate cell in any of the embodiments shown in FIG. 4 or FIG. 5. The apparatus includes:
- a terminal information receiving module 801, configured to receive terminal information of the terminal sent by a source base station when the terminal performs cell handover; wherein the terminal information includes terminal environment UE context of the terminal and a measurement result of the terminal; and
- a command returning module 802, configured to return a handover command of the candidate cell to the source base station, wherein the handover command contains aggregation configuration information of the candidate cell.

In some embodiments, the aggregation configuration information of the candidate cell includes at least one aggregation configuration, and the aggregation configuration contains a timer.

In some embodiments, wherein the aggregation configuration further contains a bearer configuration, a measurement configuration, and a signal quality threshold; the bearer configuration is configured to indicate a radio bearer of a corresponding aggregation configuration, and the measurement configuration is configured to indicate a reference signal type and a signal quality type of the corresponding aggregation configuration.

In some embodiments, the apparatus further includes:
- a bearer information receiving module, configured to receive bearer information of an aggregation connection sent by the terminal, after the terminal establishes the aggregation connection corresponding to a target aggregation configuration in the aggregation configuration information of the candidate cell;
- wherein, the aggregation connection includes a connection based on CA, DC or LWA technology; when the aggregation connection is a connection based on CA or DC, the bearer information includes a secondary cell identifier; when the aggregation connection is a connection based on LWA, the bearer information includes a wireless local area network access point identifier.

To sum up, in the solution shown in the embodiment of the present disclosure, before the terminal performs cell handover, the base station corresponding to the candidate cell sends a handover command containing the aggregation configuration information of the candidate cell to the source base station according to the terminal information sent by the source base station. The source base station generates a CHO command containing respective aggregation configuration information of at least one candidate cell and sends it to the terminal, so that the terminal can directly acquire the target aggregation configuration from the aggregation configuration information of the target cell when switching to the target cell, and establish an aggregation connection based on the target aggregation configuration. In this process, there is no need for the terminal to wait for the target cell to set the aggregation configuration after switching to the target cell, and establishment of the aggregation connection may be completed during the handover process, so that the aggregation technology can be used for data transmission immediately after successfully accessing the target cell, thereby increasing the data transmission rate during the cell handover through the CHO command.

It should be noted that, when the apparatus provided in the above embodiment realizes its functions, only the division of the above-mentioned functional modules is used as an example for illustration. In actual applications, the above-mentioned functions can be allocated by different functional modules according to actual needs. That is, the content structure of the device is divided into different functional modules, to complete all or part of the functions described above.

Regarding the apparatus in the foregoing embodiment, the specific manner in which each module performs operation has been described in detail in the embodiment of the method, and detailed description will not be given here.

An embodiment of the present disclosure provides an apparatus for establishing an aggregation connection, which can implement all or part of the steps performed by a terminal in the embodiment shown in FIG. 2 or FIG. 5 of the present disclosure. The apparatus for establishing an aggregation connection includes: a processor; and a memory for storing executable instructions of the processor, wherein, the processor is configured to:
receive a conditional handover CHO command sent by a source base station, wherein the CHO command contains respective aggregation configuration information of at least one candidate cell;
acquire a target aggregation configuration from the aggregation configuration information of a target cell, when the terminal switches to the target cell among the at least one candidate cell; and
establish an aggregation connection corresponding to the target aggregation configuration.

In some embodiments, the aggregation configuration information of each of the candidate cells includes at least one aggregation configuration, and the aggregation configuration contains a timer;
before acquiring a target aggregation configuration from the aggregation configuration information of a target cell when the terminal switches to the target cell among the at least one candidate cell, the method further includes:
starting the timer of each aggregation configuration in respective aggregation configuration information of the at least one candidate cell;
the acquiring a target aggregation configuration from the aggregation configuration information of a target cell when the terminal switches to the target cell among the at least one candidate cell includes:
acquiring the target aggregation configuration from each effective aggregation configuration when the terminal switches to the target cell among the at least one candidate cell, wherein the effective aggregation configuration is an aggregation configuration that the timer has not expired in the aggregation configuration information of the target cell.

In some embodiments, the processor is further configured to:
as for a first aggregation configuration, when the timer of the first aggregation configuration expires, delete the first aggregation configuration, wherein the first aggregation configuration is any aggregation configuration in the respective aggregation configuration information of the at least one candidate cell.

In some embodiments, the aggregation configuration further contains a bearer configuration, a measurement configuration, and a signal quality threshold; the bearer configuration is configured to indicate a radio bearer of a corresponding aggregation configuration, and the measurement configuration is configured to indicate a reference signal type and a signal quality type of the corresponding aggregation configuration;
the acquiring the target aggregation configuration from each effective aggregation configuration includes:
measuring and acquiring a signal quality of each effective aggregation configuration according to a bearer configuration of each effective aggregation configuration and a measurement configuration of each effective aggregation configuration;
acquiring an aggregation configuration whose signal quality is higher than a corresponding signal quality threshold among each effective aggregation configuration as the target aggregation configuration.

In some embodiments, when the aggregation configuration whose signal quality is higher than the corresponding signal quality threshold among each effective aggregation configuration includes at least two aggregation configurations,
the acquiring an aggregation configuration whose signal quality is higher than a corresponding signal quality threshold among each effective aggregation configuration as the target aggregation configuration includes:
acquiring, among the at least two aggregation configurations, the one arranged first in the aggregation configuration information of the target cell, as the target aggregation configuration; or
acquiring a random one of the at least two aggregation configurations as the target aggregation configuration.

In some embodiments, the processor is further configured to:
delete other aggregation configurations whose timers have not expired except for the target aggregation configuration, among the respective aggregation configuration information of the at least one candidate cell, after establishing the aggregation connection corresponding to the target aggregation configuration.

In some embodiments, the processor is further configured to:
send bearer information of the aggregation connection to a target base station after establishing the aggregation connection corresponding to the target aggregation configuration, wherein the target base station is a base station corresponding to the target cell;
wherein, when the aggregation connection is a connection based on Carrier Aggregation CA or Dual Connectivity DC, the bearer information includes a secondary cell identifier; when the aggregation connection is a connection based on LWA, the bearer information includes a wireless local area network access point identifier.

An embodiment of the present disclosure provides an apparatus for establishing an aggregation connection, which can implement all or part of the steps performed by a source base station in the embodiment shown in FIG. 3 or FIG. 5 of the present disclosure. The apparatus for establishing an aggregation connection includes: a processor; and a memory for storing executable instructions of the processor, wherein, the processor is configured to:
send a conditional handover CHO command to the terminal, wherein the CHO command contains respective aggregation configuration information of at least one candidate cell.

In some embodiments, the aggregation configuration information of each of the candidate cells includes at least one aggregation configuration, and the aggregation configuration contains a timer.

In some embodiments, the aggregation configuration further contains a bearer configuration, a measurement configuration, and a signal quality threshold; the bearer configuration is configured to indicate a radio bearer of a corresponding aggregation configuration, and the measurement configuration is configured to indicate a reference signal type and a signal quality type of the corresponding aggregation configuration.

In some embodiments, before sending a conditional handover CHO command to the terminal, further includes:

sending terminal information of the terminal to respective base stations corresponding to the at least one candidate cell, wherein the terminal information includes terminal environment UE context of the terminal and a measurement result of the terminal;

receiving a handover command returned by each of the at least one candidate cell, wherein the handover command includes aggregation configuration information of the corresponding candidate cell;

generating the CHO command according to the handover command returned by each of the at least one candidate cell.

An embodiment of the present disclosure provides an apparatus for establishing an aggregation connection, which can implement all or part of the steps performed by a base station in a candidate cell in the embodiment shown in FIG. 4 or FIG. 5 of the present disclosure. The apparatus for establishing an aggregation connection includes: a processor; and a memory for storing executable instructions of the processor, wherein, the processor is configured to:

receive terminal information of the terminal sent by a source base station when the terminal performs cell handover; wherein the terminal information includes terminal environment UE context of the terminal and a measurement result of the terminal; and return a handover command of the candidate cell to the source base station, wherein the handover command contains aggregation configuration information of the candidate cell.

In some embodiments, the aggregation configuration information of the candidate cell includes at least one aggregation configuration, and the aggregation configuration contains a timer.

In some embodiments, the aggregation configuration further contains a bearer configuration, a measurement configuration, and a signal quality threshold; the bearer configuration is configured to indicate a radio bearer of a corresponding aggregation configuration, and the measurement configuration is configured to indicate a reference signal type and a signal quality type of the corresponding aggregation configuration.

In some embodiments, the processor is further configured to:

receive bearer information of an aggregation connection sent by the terminal, after the terminal establishes the aggregation connection corresponding to a target aggregation configuration in the aggregation configuration information of the candidate cell;

wherein, the aggregation connection includes a connection based on CA, DC or LWA technology; when the aggregation connection is a connection based on CA or DC, the bearer information includes a secondary cell identifier; when the aggregation connection is a connection based on LWA, the bearer information includes a wireless local area network access point identifier.

The foregoing mainly takes terminals and base stations as examples to introduce the solutions provided by the embodiments of the present disclosure. It can be understood that, in order to implement the above-mentioned functions, the terminal and the base station include hardware structures and/or software modules corresponding to each function. In combination with the modules and algorithm steps of the examples described in the embodiments disclosed in the present disclosure, the embodiments of the present disclosure can be implemented in the form of hardware or a combination of hardware and computer software. Whether a certain function is executed by hardware or computer software-driven hardware depends on the specific application and design constraint conditions of the technical solution. Those skilled in the art can use different methods for each specific application to implement the described functions, but such implementation should not be considered as going beyond the scope of the technical solutions of the embodiments of the present disclosure.

Figure 9:
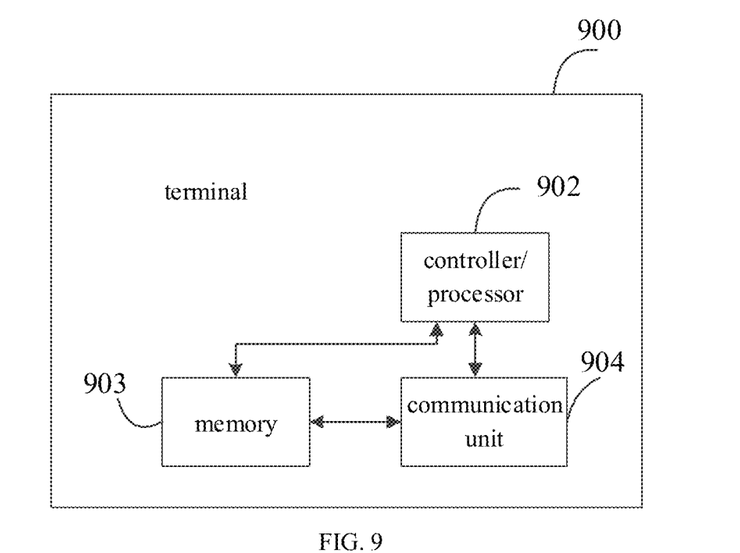
FIG. 9 is a schematic structural diagram showing a terminal according to an embodiment.

FIG. 9 is a schematic structural diagram showing a terminal according to an embodiment.

The terminal 900 includes a communication unit 904 and a processor 902. The processor 902 may also be a controller, which is represented as "controller/processor 902" in FIG. 9. The communication unit 904 is used to support the terminal to communicate with other network devices (for example, base stations, other terminals, gateways, etc.).

Further, the terminal 900 may further include a memory 903, and the memory 903 is configured to store program codes and data of the terminal 900.

It is understandable that FIG. 9 only shows a simplified design of the terminal 900. In practical applications, the terminal 900 may include any number of processors, controllers, memories, communication units, etc., and all terminals that can implement the embodiments of the present disclosure are within the protection scope of the embodiments of the present disclosure.

Figure 10:
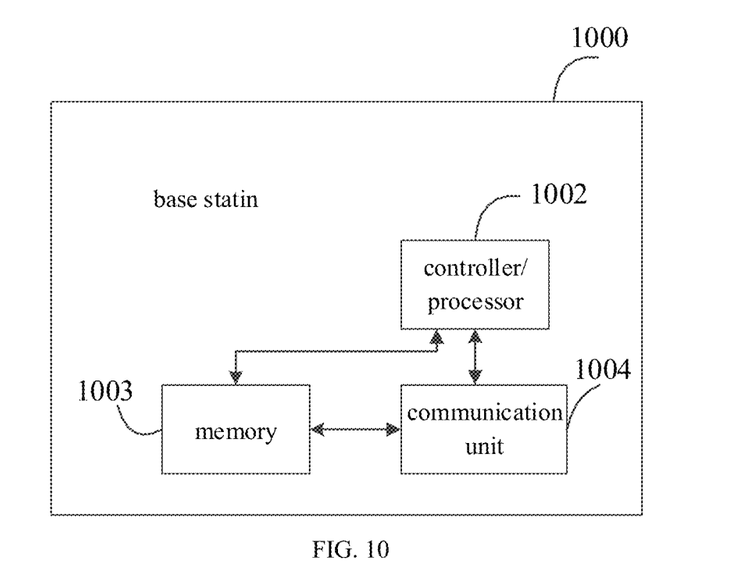
FIG. 10 is a schematic structural diagram showing a base station according to an embodiment.

FIG. 10 is a schematic structural diagram showing a base station according to an embodiment.

The base station 1000 includes a communication unit 1004 and a processor 1002. The processor 1002 may also be a controller, which is represented as "controller/processor 1002" in FIG. 10. The communication unit 1004 is used to support the terminal to communicate with other network devices (for example, base stations, other terminals, gateways, etc.).

Further, the base station 1000 may further include a memory 1003, and the memory 1003 is used to store program codes and data of the terminal 1000.

It is understandable that FIG. 10 only shows a simplified design of the base station 1000. In practical applications, the base station 1000 may include any number of processors, controllers, memories, communication units, etc., and all base stations that can implement the embodiments of the present disclosure are within the protection scope of the embodiments of the present disclosure.

Those skilled in the art should be aware that, in one or more of the foregoing examples, the functions described in the embodiments of the present disclosure may be implemented by hardware, software, firmware, or any combination thereof. When implemented by software, these functions can be stored in a computer-readable medium or transmitted as one or more instructions or codes on the computer-readable medium. The computer-readable medium includes a computer storage medium and a communication medium, where the communication medium includes any medium that facilitates the transfer of a computer program from one place to another. The storage medium may be any available medium that can be accessed by a general-purpose or special-purpose computer.

The embodiment of the present disclosure also provides a computer storage medium for storing computer executable instructions used by the above-mentioned terminal. The processor in the terminal calls the executable instructions to implement all or part of the steps of the above method for establishing an aggregation connection executed by the terminal.

The embodiment of the present disclosure also provides a computer storage medium for storing computer executable instructions used by the base station. The processor in the base station calls the executable instructions to implement all or part of the steps of the above method for establishing an aggregation connection executed by the source base station or the base station in the candidate cell.

The technical solutions provided by the embodiments of the present disclosure may at least include the following beneficial effects.

The terminal receives the conditional handover CHO command sent by a source base station before performing the cell handover, wherein the CHO command contains respective aggregation configuration information of at least one candidate cell; when the terminal switches to a target cell, it can directly acquire a target aggregation configuration from the aggregation configuration information of the target cell; and establish an aggregation connection based on the target aggregation configuration. In this process, there is no need to wait for the target cell to set the aggregation configuration after switching to the target cell, and establishment of the aggregation connection may be completed during the handover process, so that the aggregation technology can be used for data transmission immediately after successfully accessing the target cell, thereby increasing the data transmission rate during the cell handover through the CHO command.

Other embodiments of the disclosure will be apparent to those skilled in the art from consideration of the specification and practice of the disclosure disclosed here. This disclosure is intended to cover any variations, uses, or adaptations of the disclosure following the general principles thereof and including known knowledge or conventional technical means in the art not disclosed in the present disclosure. It is intended that the specification and embodiments are considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A method for establishing an aggregation connection, comprising:
   receiving, by a terminal, a conditional handover (CHO) command sent by a source base station, wherein the CHO command comprises respective aggregation configuration information of at least one candidate cell;
   acquiring, by the terminal, a target aggregation configuration from aggregation configuration information of a target cell in response to determining that the terminal switches to the target cell among the at least one candidate cell; and
   establishing, by the terminal, an aggregation connection corresponding to the target aggregation configuration.

2. The method according to claim 1, wherein the aggregation configuration information of each of the at least one candidate cells comprises at least one aggregation configuration, and the at least one aggregation configuration comprises a timer;
   wherein before acquiring the target aggregation configuration from the aggregation configuration information of the target cell in response to determining that the terminal switches to the target cell among the at least one candidate cell, the method further comprising:
   starting the timer of each aggregation configuration in respective aggregation configuration information of the at least one candidate cell;
   wherein acquiring the target aggregation configuration from the aggregation configuration information of the target cell in response to determining that the terminal switches to the target cell among the at least one candidate cell comprises:
   acquiring the target aggregation configuration from each effective aggregation configuration in response to determining that the terminal switches to the target cell among the at least one candidate cell, wherein the effective aggregation configuration is an aggregation configuration that the timer has not expired in the aggregation configuration information of the target cell.

3. The method according to claim 2, further comprising:
   in response to determining that the timer of the first aggregation configuration expires, deleting the first aggregation configuration, wherein the first aggregation configuration is any aggregation configuration in the respective aggregation configuration information of the at least one candidate cell.

4. The method according to claim 2, wherein the aggregation configuration further comprises a bearer configuration, a measurement configuration, and a signal quality threshold; the bearer configuration is configured to indicate a radio bearer of a corresponding aggregation configuration, and the measurement configuration is configured to indicate a reference signal type and a signal quality type of the corresponding aggregation configuration; and
   wherein acquiring the target aggregation configuration from each effective aggregation configuration comprises:
   measuring and acquiring a signal quality of each effective aggregation configuration according to a bearer configuration of each effective aggregation configuration and a measurement configuration of each effective aggregation configuration; and
   acquiring an aggregation configuration with signal quality higher than a corresponding signal quality threshold among each effective aggregation configuration as the target aggregation configuration.

5. The method according to claim 4, wherein in response to determining that the aggregation configuration with the signal quality higher than the corresponding signal quality threshold among each effective aggregation configuration comprises at least two aggregation configurations,
   acquiring the aggregation configuration with the signal quality higher than the corresponding signal quality threshold among each effective aggregation configuration as the target aggregation configuration comprises:
   acquiring a first aggregation configuration information among the at least two aggregation configurations as the target aggregation configuration, wherein the first aggregation configuration information is arranged first in the aggregation configuration information of the target cell; or
   acquiring a random one of the at least two aggregation configurations as the target aggregation configuration.

6. The method according to claim 1, further comprising:
   deleting other aggregation configurations with timers that have not expired except for the target aggregation configuration, among the respective aggregation configuration information of the at least one candidate cell, after establishing the aggregation connection corresponding to the target aggregation configuration.

7. The method according to claim 1, further comprising:
sending bearer information of the aggregation connection to a target base station after establishing the aggregation connection corresponding to the target aggregation configuration, wherein the target base station is a base station corresponding to the target cell;
wherein, in response to determining that the aggregation connection is a connection based on Carrier Aggregation CA or Dual Connectivity DC, the bearer information comprises a secondary cell identifier; in response to determining that the aggregation connection is a connection based on LTE-Wireless Local Area Networks AggregaTIon LWA, the bearer information comprises a wireless local area network access point identifier.

8. A method for establishing an aggregation connection, comprising:
sending, by a source base station, a conditional handover (CHO) command to a terminal performing cell handover, wherein the CHO command comprises respective aggregation configuration information of at least one candidate cell.

9. The method according to claim 8, wherein the aggregation configuration information of each of the at least one candidate cell comprises at least one aggregation configuration, and the aggregation configuration comprises a timer.

10. The method according to claim 9, wherein the aggregation configuration further comprises a bearer configuration, a measurement configuration, and a signal quality threshold; the bearer configuration is configured to indicate a radio bearer of a corresponding aggregation configuration, and the measurement configuration is configured to indicate a reference signal type and a signal quality type of the corresponding aggregation configuration.

11. The method according to claim 8, wherein before sending the CHO command to the terminal, the method further comprises:
sending terminal information of the terminal to respective base stations corresponding to the at least one candidate cell, wherein the terminal information comprises terminal environment user equipment (UE) context of the terminal and a measurement result of the terminal;
receiving a handover command returned by each of the at least one candidate cell, wherein the handover command comprises aggregation configuration information of the corresponding candidate cell; and
generating the CHO command according to the handover command returned by each of the at least one candidate cell.

12. A method for establishing an aggregation connection, comprising:
receiving, by a base station corresponding to a candidate cell, terminal information of a terminal sent by a source base station in response to determining that the terminal performs cell handover, wherein the terminal information comprises terminal environment user equipment (UE) context of the terminal and a measurement result of the terminal; and
returning, by the base station, a handover command of the candidate cell to the source base station, wherein the handover command comprises aggregation configuration information of the candidate cell.

13. The method according to claim 12, wherein the aggregation configuration information of the candidate cell comprises at least one aggregation configuration, and the aggregation configuration comprises a timer.

14. The method according to claim 12, wherein the aggregation configuration further comprises a bearer configuration, a measurement configuration, and a signal quality threshold; the bearer configuration is configured to indicate a radio bearer of a corresponding aggregation configuration, and the measurement configuration is configured to indicate a reference signal type and a signal quality type of the corresponding aggregation configuration.

15. The method according to claim 12, further comprising:
receiving bearer information of an aggregation connection sent by the terminal, after the terminal establishes the aggregation connection corresponding to a target aggregation configuration in the aggregation configuration information of the candidate cell;
wherein, in response to determining that the aggregation connection is a connection based on CA or DC, the bearer information comprises a secondary cell identifier; in response to determining that the aggregation connection is a connection based on LWA, the bearer information comprises a wireless local area network access point identifier.

16. An apparatus for establishing an aggregation connection, applied in a terminal, and comprising:
a processor; and
a memory for storing executable instructions of the processor,
wherein, the processor is configured to perform steps of the method for establishing an aggregation connection according to claim 1.

17. An apparatus for establishing an aggregation connection, applied in a source base station when a terminal performs cell handover, and the apparatus comprising:
a processor; and
a memory for storing executable instructions of the processor,
wherein, the processor is configured to perform steps of the method for establishing an aggregation connection according to claim 8.

18. An apparatus for establishing an aggregation connection, applied in a base station corresponding to a candidate cell when a terminal performs cell handover, and the apparatus comprising:
a processor; and
a memory for storing executable instructions of the processor,
wherein, the processor is configured to perform steps of the method for establishing an aggregation connection according to claim 12.

19. A non-transitory computer-readable storage medium, wherein the computer-readable storage medium comprises executable instructions, and a processor in a terminal causes the executable instructions to implement methods for establishing an aggregation connection according to claim 1.

* * * * *